United States Patent
Matteo

[11] 3,768,585
[45] Oct. 30, 1973

[54] STEERING AXLE
[75] Inventor: Nicholas J. Matteo, Philadelphia, Pa.
[73] Assignee: Eaton Corporation, Cleveland, Ohio
[22] Filed: Aug. 17, 1971
[21] Appl. No.: 172,458

[52] U.S. Cl. .......................... 180/79.2 R, 280/95 R
[51] Int. Cl. .............................................. B62d 5/10
[58] Field of Search ...................... 280/95 R, 87 B; 180/79.2 R

[56] References Cited
UNITED STATES PATENTS

| | | | |
|---|---|---|---|
| 3,059,944 | 10/1962 | Goodacre | 280/95 R |
| 3,480,100 | 11/1969 | Gaulke | 180/79.2 R |
| 759,090 | 5/1904 | Gardner | 280/94 X |
| 2,152,021 | 3/1939 | Baumer | 180/79.2 R |
| 2,835,507 | 5/1958 | Davies | 280/112 R |

FOREIGN PATENTS OR APPLICATIONS

| | | | |
|---|---|---|---|
| 127,923 | 2/1902 | Germany | 280/95 R |
| 870,374 | 6/1961 | Great Britain | 180/79.2 R |
| 671,236 | 4/1952 | Great Britain | 280/95 R |
| 1,030,199 | 5/1958 | Germany | 280/95 R |

*Primary Examiner*—Benjamin Hersh
*Assistant Examiner*—L. J. Paperner
*Attorney*—Leslie H. Blair et al.

[57] ABSTRACT

A steering axle for use in a vehicle, such as an industrial truck or the like, comprises a frame portion, spindle portions pivotably mounted with respect to a frame portion, and a double-acting hydraulic cylinder mounted transversely on said frame portion for both rotational and translational movement relative thereto. The piston rod of the hydraulic cylinder is connected at each distal end to one of the steering arms whereby the application of hydraulic fluid pressure in either direction will cause translational and rotational movement of said piston rod and cylinder to thereby provide differential steering of the vehicle.

4 Claims, 6 Drawing Figures

PATENTED OCT 30 1973   3,768,585

INVENTOR.
NICHOLAS J. MATTEO
BY Teagno & Toddy
TEAGNO & TODDY
ATTORNEYS

INVENTOR.
NICHOLAS J. MATTEO
BY Teagno & Toddy
TEAGNO & TODDY
ATTORNEYS 3,768,585

STEERING AXLE

BACKGROUND OF THE INVENTION

1. Field of the Invention

The present invention relates to a steering axle, and more particularly to a differential steering axle for an industrial lift truck which incorporates a power steering means and wherein the power steering means is supported by said axle.

2. Description of the Prior Art

Prior art steering axles of the type to which this invention relates requre complex and expensive linkages for translating linear motion of the hydraulic steering cylinder rod into usable motion to provide differential steering of the vehicle wheels. This is due mainly to the fact that the hydraulic cylinder is rigidly mounted with respect to a frame member of the steering axle whereby the hydraulic cylinder and associated cylinder rod are only capable of supplying straight-line powered movement relative to the frame member of the steering axle. Consequently, since most vehicles which utilize this type of steering axle require differential steering, linkages having relatively complex geometrical relationships have been required in order to transform this straight-line motion into the complex type of motion required in order to provide differential steering of the vehicle. For purposes of this disclosure, and as is customarily known to persons skilled in the art, differential steering is defined as the type of steering in which one of a pair of vehicle wheels on an axle is pivoted through a greater angle when executing a turn than is its associated wheel at the opposite end of the axle. Thus, differential steering, thereby enables a vehicle in which it is incorporated to have a much shorter turning radius than vehicles utilizing conventional steering.

One example of such a prior art steering axle is U.S. Pat. No. 3,480,100 issued Nov. 25, 1969 to Gaulke. In the Gaulke Patent, there is disclosed a steering axle having a frame member and a pair of steering wheels pivotally attached thereto. Rigidly mounted to the steering axle frame member is a double acting hydraulic cylinder capable of supplying transverse motion with respect to the frame member by means of piston rod associated with the hydraulic cylinder. This transverse motion is then transformed into curvilinear type of motion required for differential steering of the vehicle by linkage mechanisms attached to the distal ends of the transversely extending piston rod. The device of the Gaulke patent is further made complex by the fact that the geometrical relationship of the steering cylinder rod to the steering arms attached to the vehicle wheels is critical and requires frequent adjustment of the linkage mechanisms in order to maintain proper differential steering of the vehicle.

SUMMARY OF THE INVENTION

The primary object of the present invention is to provide a new and improved steering axle construction which is capable of supplying differential type steering while eliminating the complex linkage mechanisms of prior art devices.

Another object of the present invention is to provide a power steering linkage means for use in a steering axle of a vehicle and wherein all of the steering forces are reacted within the axle itself whereby no steering errors are introduced through relative movement between the axle and the main frame of the vehicle.

Another object of the present invention is to provide an improved steering axle having a double acting steering cylinder mounted on the axle and wherein the piston rod of said steering cylinder acts as a tie-rod for transmitting motion to steer the vehicle wheels.

Another object of the present invention is to provide a simplified steering axle arrangement having a frame and wherein a double-acting power steering cylinder having a piston rod is mounted for translational and rotational movement relative to the frame of the axle to provide differential steering of the axle.

Other objects and advantages will become apparent from the detailed description of the preferred embodiment and associated description of the drawings which follow hereinafter.

DETAILED DESCRIPTION OF THE PREFERRED EMBODIMENT

Figure 1:
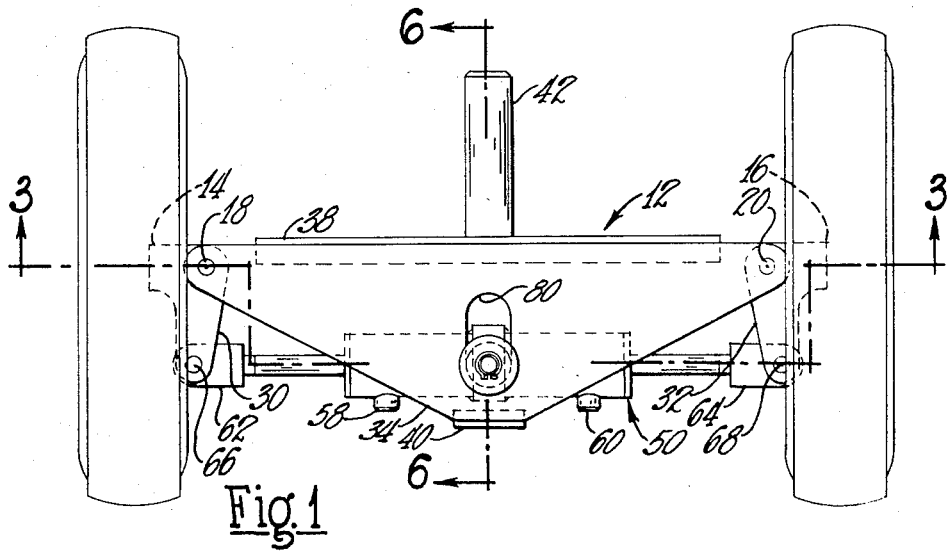
FIG. 1 is a top view of the steering axle of the present invention.

With reference to the drawing, FIG. 1 illustrates a steering axle 10 comprising a frame portion 12 having spindle members 14, 16 disposed at the distal ends thereof and pivotally mounted to the frame portion 12 by means of king pins 18, 20 passing therethrough. For the most part, the spindle members 14, 16 are a rather conventional design and include bearing means 22, 24 for rotatably supporting ground-engaging vehicle wheels 26 and 28 respectively. The spindle members 14, 16 further include steering arm members 30 and 32 respectively integrally attached therewith for pivoting the spindles 14, 16 and the associated ground-engaging vehicle wheels 26, 28 about the king pins 18, 20 respectively whereby the vehicle upon which the steering axle of the present invention is mounted may be steered. For the most part, the steering axle portions previously described are of a rather conventional design as will be evident to those skilled in the art.

Figure 2:
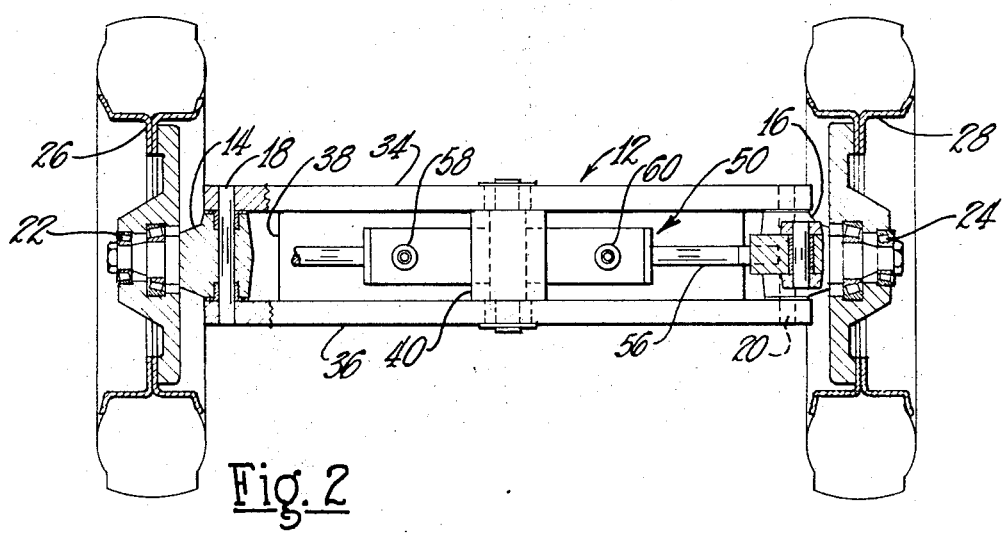
FIG. 2 is a front elevational view of the steering axle of the present invention taken partly in cross-section.
Figure 6:
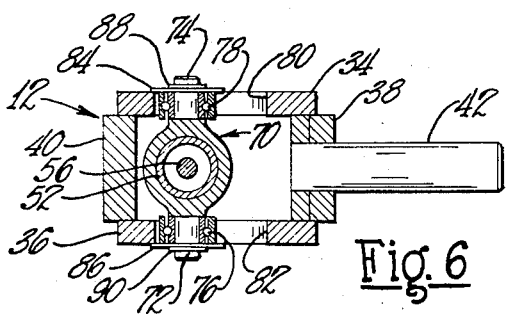
FIG. 6 is a cross-sectional view taken along the lines 6—6 of FIG. 1 disclosing further details of the mounting arrangement of the hydraulic cylinder of the present invention.
Figure 3:
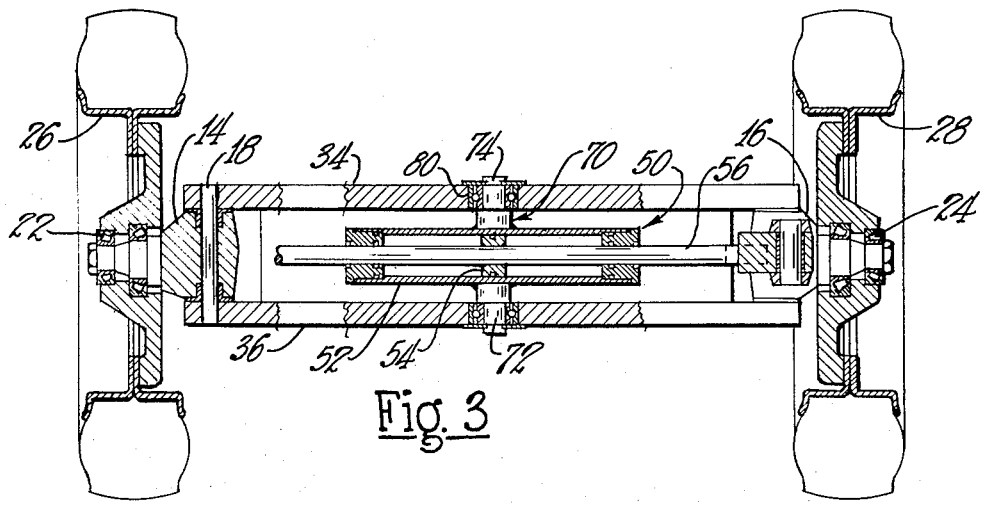
FIG. 3 is a cross-sectional view of a steering axle of the present invention taken along the lines 3—3 of FIG. 1.

The frame portion 12 of the steering axle 10 further comprises a first triangularly shaped plate member 34 as shown in FIG. 1 and a second similarly shaped plate member 36 spaced vertically therefrom as shown in FIG. 2. The plate members 34, 36 are integrally joined to form a box-like, rigid construction by means of web portions 38 and 40 extending therebetween. The attachment of the plate members and web portions to each other is preferably accomplished by weld type construction, however, any other suitable means of attachment may be used.

Extending from web portion 38 and integrally attached thereto is a trunnion member 42 which adapts the steering axle 10 of the present invention for a walking beam type mount to an industrial truck or the like (not shown). The walking beam type of mounting of steering axles to industrial trucks is well-known in the art. For example, U.S. Letters Patent No. 2,829,903 and 3,086,791 both issued to B. I. Ulinski and assigned to the assignee of the present invention both disclose mounting of a steering axle in a manner similar to that proposed in this preferred embodiment, consequently, further description of this type of mounting arrangement is believed unnecessary to enable those skilled in the art to practice the invention of the instant application.

The steering axle 10 further comprises power steering means 50 including a double acting hydraulic cylinder 52, a piston member 54 slidably disposed in the hydraulic cylinder 52 and integrally attached to a piston rod member 56 extending therethrough. The power steering means 50 is adapted to be connected to a source of pressurized hydraulic fluid (not shown) by means of the hydraulic fluid connections 58, 60 extending from the hydraulic cylinder 52 and disposed on either side of the piston member 54 as shown in FIG. 1. From the foregoing, it should be evident that pressurization of one side of the double acting hydraulic cylinder will cause the piston rod member 56 to move in one direction whereas pressurization of the opposite side of the hydraulic cylinder will cause the piston rod member to move in the opposite direction. Further details of the hydraulic circuit of the power steering means are not necessary as such hydraulic circuits are well-known in the art.

Threadably mounted at either end of the piston rod member 56 are a pair of linkage members 62, 64. The linkage members 62, 64 are in turn pivotally connected to steering arm members 30, 32 by means of pivot pins 66, 68 respectively. The threadable engagement between the piston rod member 56 and the linkage connections 62, 64 is merely a convenience feature to provide for some initial adjustment at assembly or as take-up for wear and adjustment during routine maintenance of the industrial truck to which the steering axle of the instant invention is attached. The piston rod 56 and linkage connection assembly thus provides a tie-rod extending between the steering arm members 30, 32.

The power steering means 50 further includes a trunnion member 70 having end portions 72, 74 disposed approximate the center of and rigidly attached to the double-acting hydraulic cylinder 52. The trunnion end portions receive bearing members 76, 78 rotatably disposed thereon. Although the trunnion bearing members 76, 78 can be of any bearing type or material, in the preferred embodiment I prefer to use ball bearings to eliminate friction, wear and facilitate more accurate adjustment of the steering geometry. The trunnion bearing members 76, 78 are received in a pair of elongated slots 80, 82 in the triangularly shaped plate members 34, 36 respectively of frame portion 12. The elongated slots 80, 82 are slightly greater in width than the diameter of anti-friction bearing members 76, 78 in order to allow the anti-friction bearing members 76, 78 free rolling movement with respect to either side of elongated slots 80, 82 when in engagement therewith.

In essence, the edges of elongated slots 80, 82 act as runways or guides for maintaining the hydraulic cylinder centered with respect to the longitudinal centerline of the vehicle while allowing relatively free translational movement of the hydraulic cylinder along the centerline of the vehicle and relative rotational movement of the hydraulic cylinder about a point lying on the longitudinal centerline of the vehicle. This type of movement is necessary in order to accomplish differential steering of the vehicle ground engaging wheel with the smallest possible number of moving parts and adjustments and forms an important part of the invention.

In order to maintain the vertical relationship of the trunnion member 70 and provide support for the hydraulic cylinder to prevent sagging of the piston rod member 56 due to the weight of the hydraulic cylinder, the trunnion end portions 72, 74 further include a pair of washers 84, 86 secured thereto by means of snap rings 88 and 90 respectively. These enlarged washers provide the further advantage of protecting the anti-friction bearing surfaces from direct impingement by dust and dirt particles stirred up by movement of the vehicle.

In the foregoing arrangement, it is important to note that when the vehicle wheels are in the straight ahead position, the bearing members 76, 78 will be disposed adjacent the end of slots 80, 82 respectively farthest from the centerline of the axle and as the vehicle wheels are turned in either direction, the bearing members 76, 78 roll toward the axle centerline and are guided by one edge of the slot 80, 82 in which these members are received. This arrangment allows the hydraulic cylinder and piston rod of the instant invention to move in the combined rotational, translational manner previously described which provides differential steering of the vehicle wheels. In other words, both the hydraulic cylinder and tie-rod pivot about a moving axis represented by the centerline of the trunnion bearings while the tie-rod moves transversely in steering the vehicle wheels. It is this combined movement which effects differential steering.

DESCRIPTION OF OPERATION

Figure 4:
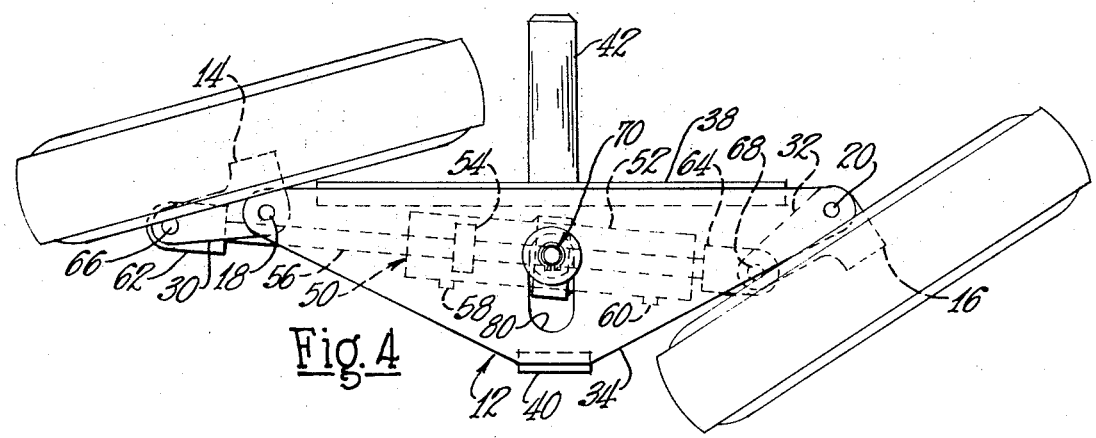
FIG. 4 is a top view of the steering axle of the present invention similar to FIG. 1 showing operation of the steering axle of the present invention when executing a turn in one direction.
Figure 5:
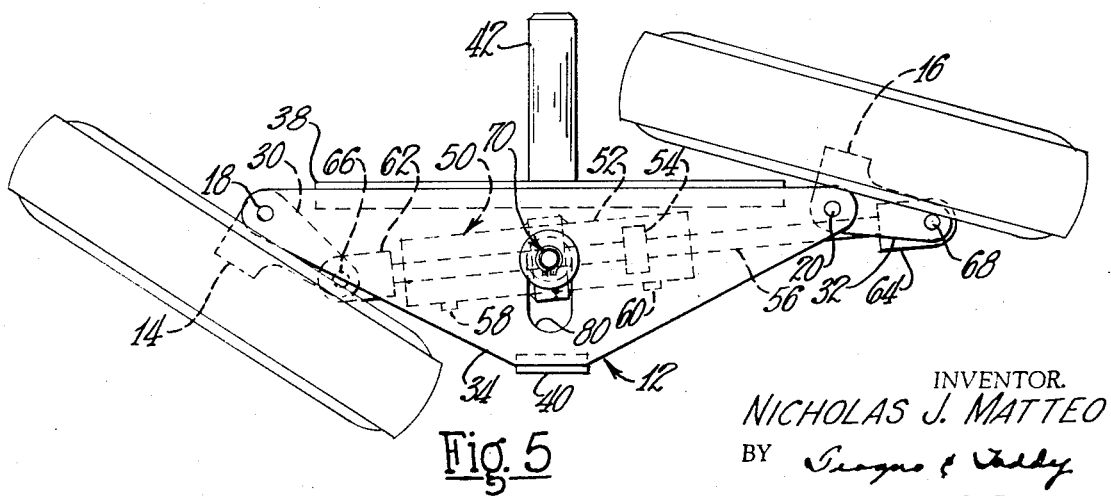
FIG. 5 is a view similar to FIG. 4 showing operation of the steering axle mechanism when executing a turn in the other directon.

From the foregoing, it should be apparent that upon initial application of hydraulic fluid pressure to one side of the piston 54, the hydraulic cylinder 52 will move slightly in a transverse direction relative to the longitudinal centerline of the vehicle until the bearing members 76, 78 engage an edge of the slots 80, 82 respectively and thereby react to prevent further transverse movement of the hydraulic cylinder 52. Since the ends of the piston rod 56 are pivotably connected to steering arms 30, 32 which are in turn pivotably mounted by king pins 18, 20 relative to the axle assembly, application of further hydraulic pressure will create a force tending to move the rod 56 in a curvilinear arc about the king pins 18, 20. However, simultaneously with this force, the hydraulic cylinder 52 carrying the piston rod 56 will be subjected to a force tending to move the cylinder 52 toward the axle frame because both ends of rod 56 are moving in that direction when the steering arms 30, 32 pivot about the king pins 18, 20 respectively, therefore the center of the rod and the hydraulic cylinder surrounding it must follow suit. As the bearing members 84, 86 carrying the hydraulic cylinder 52 roll closer to a line connecting the centerline of king pins 18, 20, the geometrical relationship of the linkages and reaction between the hydraulic cylinder 52 at the trunnion bearing 84, 86 and the frame 12 at the slots 80, 82 creates a multiplier effect which causes the wheel on the inside of the turn to be turned much more sharply than the wheel at the outside of the turn, thereby providing differential steering as shown in FIGS. 4 and 5.

Having described my invention so as to enable one of ordinary skill in the art to practice it, I now claim:

1. In a steering axle for a vehicle, said steering axle having a main frame, a pair of rotatable ground engaging wheels steerably mounted at opposite ends of said frame, a steering arm associated with each of said wheels for steering said wheels upon movement thereof, a tie-rod assembly extending between said steering arms, each end of said tie-rod assembly being pivotally connected to one of said steering arms to transmit motion therebetween, said tie-rod assembly having a piston integrally attached thereto intermediate the ends thereof, and a double acting hydraulic cylinder enclosing said piston whereby said tie-rod will move upon pressurization of said hydraulic cylinder;

the improvement comprising guide means mounting said hydraulic cylinder to said main frame for linear movement perpendicular to a line connecting the steering axes of said ground engaging wheels and for rotation about a substantially vertical axis, said guide means comprising at least one slot in said main frame and a bearing member rotatably mounted on said hydraulic cylinder engaging an edge of said slot for guiding movement of said hydraulic cylinder and tie-rod relative to said frame.

2. In a steering axle for a vehicle, said steering axle having a main frame, a pair of rotatable ground engaging wheels steerably mounted at opposite ends of said frame, a steering arm associated with each of said wheels for steering said wheels upon movement thereof, a tie-rod assembly extending between said steering arms, each end of said tie-rod assembly being pivotally connected to one of said steering arms to transmit motion therebetween, said tie-rod assembly having a piston integrally attached thereto intermediate the ends thereof, and a double acting hydraulic cylinder enclosing said piston whereby said tie-rod will move upon pressurization of said hydraulic cylinder;

the improvement in which said main frame comprises a pair of spaced frame members, said hydraulic cylinder being disposed between said spaced frame members, and guide means on said spaced frame members mounting said hydraulic cylinder for linear movement perpendicular to a line connecting the steering axes of said ground engaging wheels and for rotation about a substantially vertical axis.

3. The invention of claim 2, wherein said means mounting said hydraulic cylinder comprises aligned, spaced slots formed in said frame members, and a trunnion mounting member attached to said cylinder, said trunnion mounting member including bearing members received in said slots and engageable with the edges of said slots for guiding movement of said cylinder and tie-rod relative to said frame.

4. The invention of claim 2, including a trunnion member extending from said main frame for mounting said steering axle to said vehicle for rotation about a horizontal axis.

* * * * *